United States Patent
Hattori et al.

(10) Patent No.: US 7,908,510 B2
(45) Date of Patent: Mar. 15, 2011

(54) STORAGE SYSTEM AND METHOD OF DESIGNING DISASTER RECOVERY CONSTITUTION

(75) Inventors: Kunihiro Hattori, Odawara (JP); Tomoki Shoji, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 358 days.

(21) Appl. No.: 12/007,644

(22) Filed: Jan. 14, 2008

(65) Prior Publication Data

US 2009/0049328 A1  Feb. 19, 2009

(30) Foreign Application Priority Data

Jul. 10, 2007  (JP) ................................. 2007-180728

(51) Int. Cl.
*G06F 11/00* (2006.01)
(52) U.S. Cl. ..................................... 714/4; 714/6; 714/7
(58) Field of Classification Search .................. 714/4, 6, 714/7; 711/162
See application file for complete search history.

(56) References Cited

U.S. PATENT DOCUMENTS

| | | | |
|---|---|---|---|
| 2004/0028004 A1 | 2/2004 | Hayashi et al. | |
| 2004/0225697 A1* | 11/2004 | Asano et al. | 707/204 |
| 2005/0066239 A1* | 3/2005 | Keeton et al. | 714/47 |
| 2005/0166018 A1 | 7/2005 | Miki | |
| 2007/0038824 A1 | 2/2007 | Suishu et al. | |
| 2007/0198791 A1* | 8/2007 | Iwamura et al. | 711/162 |
| 2007/0234102 A1* | 10/2007 | Fan et al. | 714/4 |
| 2008/0270822 A1* | 10/2008 | Fan et al. | 714/4 |
| 2009/0049328 A1* | 2/2009 | Hattori et al. | 714/1 |
| 2010/0077162 A1* | 3/2010 | Kaneko et al. | 711/162 |

FOREIGN PATENT DOCUMENTS

| | | |
|---|---|---|
| JP | 2004-72772 | 8/2003 |
| JP | 2005-84953 | 9/2003 |
| JP | 2005-215885 | 1/2004 |

* cited by examiner

*Primary Examiner* — Philip Guyton
(74) *Attorney, Agent, or Firm* — Volpe and Koenig, P.C.

(57) ABSTRACT

The present invention detects patterns that conform to the user conditions in cases where a disaster recovery constitution is constructed by connecting a plurality of sites. The design system is used in cases where the disaster recovery constitution is provided in a storage system. The site information acquisition section acquires information relating to the constitution in the sites and information relating to the connections between the sites, and stores the information in the site information table. The candidate pattern generation section generates candidate patterns for each of the parameters on the basis of the site information table and a basic pattern table. The candidate pattern evaluation section evaluates the respective candidate patterns by using the user condition table and presents patterns which conform to the user conditions to the user. The document output section generates a construction procedure and operating procedure on the basis of patterns selected by the user.

12 Claims, 17 Drawing Sheets

FIG. 5

SITE INFORMATION TABLE  T1

| | SITE 1 | | SITE 2 | | SITE 3 | | ... |
|---|---|---|---|---|---|---|---|
| STORAGE PERFORMANCE | CPU PERFORMANCE | | STORAGE PERFORMANCE | | STORAGE PERFORMANCE | | |
| | MEMORY SIZE | | | | | | |
| | VOLUME SIZE | | | | | | |
| | ... | | | | | | |
| INTER-SITE DISTANCE | DC2 : 40Km | | INTER-SITE DISTANCE | | INTER-SITE DISTANCE | | |
| | DC3 : 200Km | | | | | | |
| | DC4 : 800Km | | | | | | |
| | ... | | | | | | |
| CONNECTION TYPE | DC2 : FC | | CONNECTION TYPE | | CONNECTION TYPE | | |
| | DC3 : iSCSI | | | | | | |
| | DC4 : iSCSI | | | | | | |
| | ... | | | | | | |
| LINE QUALITY | DC2 : 100% | | LINE QUALITY | | LINE QUALITY | | |
| | DC3 : 90% | | | | | | |
| | DC4 : 80% | | | | | | |
| | ... | | | | | | |
| LINE SPEED | DC2 : 4Gbps | | LINE SPEED | | LINE SPEED | | |
| | DC3 : 2Gbps | | | | | | |
| | DC4 : 4Gbps | | | | | | |
| | ... | | | | | | |

| USER CONDITION TABLE ||
|---|---|
| PRIMARY SITE | DC1 |
| BASIC PATTERN | FIRST CHOICE: CASCADE<br>SECOND CHOICE: MULTI-TARGET |
| INTER-SITE DISTANCE | SHORT DISTANCE: 50 Km OR LESS<br>LONG DISTANCE: 500 Km OR MORE |
| CONNECTION TYPE | — |
| LINE QUALITY | 80% OR MORE |
| LINE SPEED | 4Gpbs OR MORE |
| RPO | NO MORE THAN 10 MINUTES |
| RTO | NO MORE THAN 1 HOUR |

FIG. 7

BASIC PATTERN TABLE (T3)

T31:

| CASCADE | RELAY SITE | LESS THAN 100 Km | DISTANT REMOTE SITE | 100 Km OR MORE |
|---|---|---|---|---|

T32:

| MULTI-TARGET | NEARBY REMOTE SITE | LESS THAN 100 Km |
|---|---|---|
| | DISTANT REMOTE SITE | 100 Km OR MORE |

T33:

| TOPOLOGY | INTER-SITE LINE SPEED | INTER-SITE LINE QUALITY | RTO | RPO |
|---|---|---|---|---|
| CASCADE | Th1C | Th2C | Th3C | Th4C |
| MULTI-TARGET | Th1M | Th2M | Th3M | Th4M |

FIG. 10

| # | BASIC PATTERN | PRIMARY SITE | NEARBY REMOTE SITE | RELAY SITE | DISTANT REMOTE SITE |
|---|---|---|---|---|---|
| \multicolumn{6}{c}{PRIMARY CANDIDATE PATTERN TABLE} |
| 1 | CASCADE | DC1 | — | DC2 | DC3 |
| 2 | CASCADE | DC1 | — | DC4 | DC7 |
| ... | | | | | |
| 11 | MULTI-TARGET | DC1 | DC2 | — | DC3 |
| 12 | MULTI-TARGET | DC1 | DC4 | — | DC7 |
| ... | | | | | |

APPLICABLE PATTERN TABLE T5

| # | BASIC PATTERN | PRIMARY SITE | NEARBY REMOTE SITE | RELAY SITE | DISTANT REMOTE SITE | LINE QUALITY | LINE SPEED | RPO | RTO |
|---|---|---|---|---|---|---|---|---|---|
| 1 | CASCADE | DC1 | — | DC2 | DC3 | | | | |
| 2 | CASCADE | DC1 | — | DC4 | DC7 | | | | |
| 3 | MULTI-TARGET | DC1 | DC2 | — | DC3 | | | | |
| 4 | MULTI-TARGET | DC1 | DC4 | — | DC7 | | | | |

STORAGE SYSTEM AND METHOD OF DESIGNING DISASTER RECOVERY CONSTITUTION

CROSS-REFERENCE TO RELATED APPLICATIONS

This application relates to and claims priority from Japanese Patent Application No. 2007-180728 filed on Jul. 10, 2007, the entire disclosure of which is incorporated herein by reference.

BACKGROUND OF THE INVENTION

1. Field of the Invention

The present invention relates to a storage system and a method of designing a disaster recovery constitution.

2. Description of the Related Art

The storage system comprises at least one storage control device called a 'disk array system' or the like, for example and provides a host computer ('host' hereinbelow) with data storage services. The storage control device can have a multiplicity of disk drives arranged in an array to construct a RAID (Redundant Array of Independent Disks)-based storage area.

Further, as is known for a so-called disaster recovery system, a backup site can also be provided in a location that is remotely separated from the main site in preparation for a wide scale disaster or the like. The backup site has a backup storage control device installed thereon, and the storage control device stores data groups which are identical to those of the main site.

According to a first conventional technology, a wide-scale disaster or the like can be provided for by remote-copying data from the storage control device of the main site to another storage control device of the backup site (Japanese Application Laid Open No. 2005-215885). Accordingly, even in cases where the main site is stopped by a fault or the like, data processing services can be continued by means of the backup site. However, in cases where a fault occurs at the only backup site prior to recovery of the main site, data processing services cannot be provided for the host.

Therefore, a second conventional technology according to which a plurality of backup sites are provided and system redundancy can be secured even in cases where the main site is suspended has been proposed (Japanese Application Laid Open No. 2005-84953). According to the second conventional technology, a plurality of secondary storage control devices are connected to a primary storage control device as described in paragraph numbers [0008] to [0010]. In cases where the stored content of the primary storage control device is updated, the updated content is immediately transmitted to the first secondary storage control device and reflected in the stored content of the first secondary storage control device. Further, the stored content of the primary storage control device is saved as journal data and the other secondary storage control device suitably reads the journal data and reflects same in its own stored content. Further, the first secondary storage control device creates journal data on the basis of a data update instruction from the primary storage control device and saves the journal data. In cases where the primary storage control device has stopped, the other secondary storage control device reads journal data from the first secondary storage control device and updates its own stored content.

As a third conventional technology, a technology for dynamically selecting a suitable interleaving method on the basis of a variety of main factors of a wireless network is also known (Japanese Application Laid Open No. 2004-72772).

However, the third conventional technology is a technology that relates to wireless communications that are unrelated to storage systems.

In the prior art, because a copy of the data is held by two or three sites, the disaster tolerance can be increased. In a case where the number of sites that the user has in their possession is at least two and no more than three, a constitution that increases fault tolerance can be easily designed by connecting the respective sites.

However, in recent years, large-scale storage systems comprising a multiplicity of sites have also been known. In a storage system comprising a multiplicity of sites, because the overall constitution of the system is complicated, it takes effort to construct a suitable disaster recovery constitution that satisfies user expectations. The user selects a plurality of sites from among the multiplicity of sites, establishes connections between the selected sites to implement a disaster recovery constitution, and then starts to put the disaster recovery constitution to use.

However, the performance of the disaster recovery constitution is determined by a combination of a plurality of parameters, such as, for example, the physical distance between the respective sites and the speed of the communication lines connecting the respective sites. Therefore, by considering a plurality of parameters for the multiplicity of sites, the user must design the disaster recovery constitution that is considered most appropriate, and this investigation and design of the disaster recovery constitution take time and effort.

SUMMARY OF THE INVENTION

The present invention was conceived in view of the above problem and an object thereof is to provide a storage system and disaster recovery constitution design method that are capable of implementing relatively easily a constitution that provides disaster recovery within a storage system that comprises a plurality of sites. Further objects of the present invention will become clear from the description of the embodiments below.

In order to solve the above problem, a storage system having a plurality of sites according to an aspect of the present invention comprises a site information acquisition section that acquires site information including information relating to the constitution in the respective sites and information relating to the connections between the respective sites, and that generates a site information table; a user condition acquisition section that acquires user conditions that are input by a user and generates a user condition table; a candidate pattern generation section that generates candidate patterns obtained by using a predetermined topology to connect a plurality of sites that are selected among the respective sites on the basis of a basic pattern table for storing patterns of a basic connection constitution of a plurality of sites and the site information table; a pattern evaluation section that evaluates the candidate patterns on the basis of the user conditions and detects applicable patterns; and a pattern selection section that selects, in cases where a plurality of the applicable patterns are detected, any one of the respective applicable patterns.

According to an embodiment of the present invention, the storage system according further comprises a document output section that generates a predetermined document by reflecting data relating to the pattern that is selected by the pattern selection section in pre-prepared template data.

According to an embodiment of the present invention, the information relating to the connections between the respective sites includes information relating to a plurality of predetermined indices that are preset; and the candidate pattern generation section generates the respective candidate patterns for each of the respective predetermined indices.

According to an embodiment of the present invention, wherein the candidate pattern generation section generates candidate patterns for other indices that differ from the respective predetermined indices on the basis of the information relating to the respective predetermined indices.

According to an embodiment of the present invention, at least one of the respective predetermined indices is a first index and the others are second indices; and the candidate pattern generation section generates primary candidate patterns relating to the first index and generates candidate patterns for each of the second indices on the basis of the primary candidate patterns and the respective second indices.

According to an embodiment of the present invention, the pattern evaluation section extracts, as secondary candidate patterns, candidate patterns that conform to all of the respective predetermined indices among the respective candidate patterns generated for each of the respective predetermined indices, and rejects secondary candidate patterns that do not conform to the user conditions among the secondary candidate patterns.

According to an embodiment of the present invention, the predetermined indices include at least any or a plurality of a physical distance between the respective sites, a type of communication lines between the respective sites, a communication speed between the respective sites, and a quality of communication between the respective sites.

According to an embodiment of the present invention, the predetermined indices include a physical distance between the respective sites, a communication speed between the respective sites, and a quality of communication between the respective sites; and the other indices include at least one of a recoverable time point index that indicates a recoverable time point and a required recovery time index that indicates the time required for recovery from a fault.

According to an embodiment of the present invention, the predetermined indices include a physical distance between the respective sites, a communication speed between the respective sites, and a quality of communication between the respective sites; the other indices include a recoverable time point index that indicates a recoverable time point and a required recovery time index that indicates the time required for recovery from a fault; and the physical distance between the sites is a first index and the respective other indices are second indices; and the candidate pattern generation section generates primary candidate patterns relating to the first index and generates candidate patterns for each of the second indices based on the primary candidate patterns and the respective second indices.

A method for designing a disaster recovery constitution in a storage system having a plurality of sites according to another aspect of the present invention comprises the steps of acquiring site information including information relating to the constitution in the respective sites and information relating to the connections between the respective sites; generating a site information table based on the site information; acquiring user conditions desired by a user relating to a disaster recovery; generating a user condition table based on the user conditions; generating candidate patterns obtained by using a predetermined topology to connect a plurality of sites that are selected from among the respective sites based on a basic pattern table for storing patterns of a basic connection constitution of a plurality of sites and the site information table; evaluating the candidate patterns based on the user conditions and detecting applicable patterns; and selecting, in cases where a plurality of the applicable patterns are detected, any one of the respective applicable patterns.

According to an embodiment of the present invention, (1) the site information includes a performance of a storage control device in the site, address information, a physical distance between the respective sites, a communication speed between the respective sites, and a quality of the communication between the respective sites, (2) the step of generating candidate patterns involves executing the steps of: generating primary candidate patterns that conform to the basic pattern from the perspective of the physical distance between the sites; extracting primary candidate patterns at or more than a preset minimum communication speed among the primary candidate patterns; extracting primary candidate patterns with no less than a preset minimum communication quality among the primary candidate patterns; calculating a recoverable time point index that indicates a recoverable time point on the basis of the site information; calculating a required recovery time index that indicates the time required for recovery from a fault on the basis of the site information; and extracting primary candidate patterns at or more than the minimum recoverable time point and minimum required recovery time which are preset among the primary candidate patterns, and (3) the step of detecting applicable patterns involves executing the steps of: detecting secondary candidate patterns by calculating a logical sum of primary candidate patterns which are generated from the perspective of the physical distance between the sites, primary candidate patterns at or more than the minimum communication speed, primary candidate patterns with no less than the minimum communication quality, and primary candidate patterns at or more than the minimum recoverable time point and the minimum required recovery time; and rejecting patterns which do not conform to the user conditions among the secondary candidate patterns and outputting the remaining patterns as compatible patterns.

According to an embodiment of the present invention, the method for designing a disaster recovery constitution further comprises the step of creating a construction procedure for constructing the selected pattern in the storage system and an operating procedure for operating the selected pattern, by reflecting the selection result relating to the applicable patterns in a pre-prepared construction procedure template and operating procedure template, respectively.

There are cases where at least some of the means, functions and steps of the present invention can be constituted as computer programs that are executed after being read by a microcomputer. Such computer programs can be distributed by being secured to storage media such as hard disks or optical disks, for example. These computer programs can also be supplied via communication networks such as the Internet. Moreover, the above characteristics of the present invention can also be suitably combined.

BRIEF DESCRIPTION OF THE DRAWINGS

FIG. 5 is an explanatory diagram that shows a site information table;

FIG. 6 is an explanatory diagram that shows a user condition table;

FIG. 7 is an explanatory diagram that shows a basic pattern table;

FIG. 10 is an explanatory diagram that shows a primary candidate pattern table;

FIG. 15 is an explanatory diagram that shows an applicable pattern table;

DESCRIPTION OF THE PREFERRED EMBODIMENTS

Figure 1:
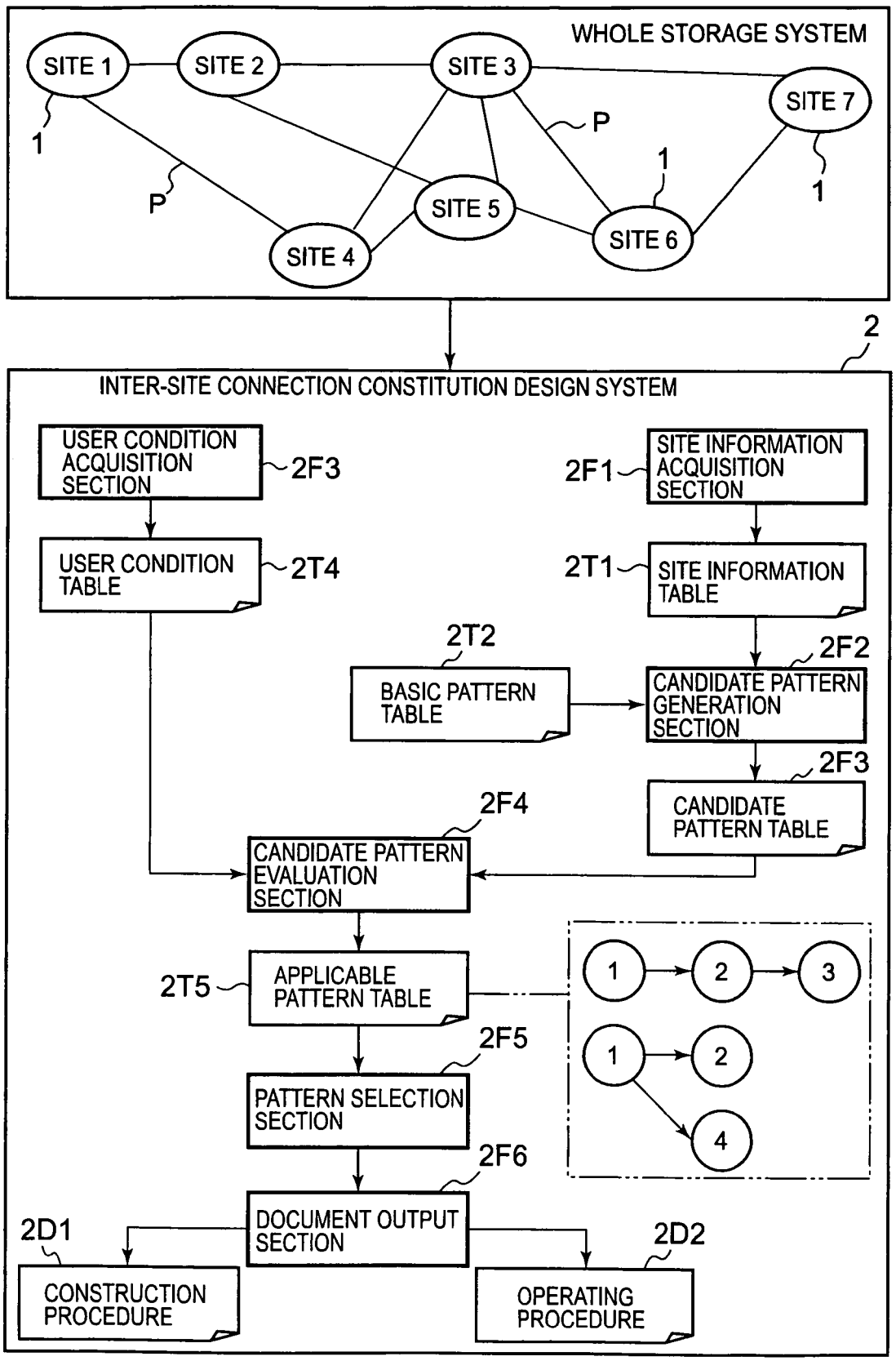
FIG. 1 is an explanatory diagram that provides an overview of the embodiment of the present invention.

Embodiments of the present invention will be described herein below with reference to the drawings. FIG. 1 is an explanatory diagram that provides an overview of this embodiment. The storage system comprises a plurality of sites 1. The respective sites 1 each comprise at least one or more hosts and storage control devices as will be described subsequently together with FIG. 2.

The respective sites 1 are disposed close to one another or spaced far apart from one another. For example, the respective sites 1 are disposed spaced apart at a distance of a few kilometers to a few hundred kilometers. The respective sites 1 are connected by a communication line P to at least one or more other sites 1. Although seven sites 1 are shown at the top of FIG. 1 for the sake of convenience, the disposition of these sites 1 is not limited to this disposition. The number of sites 1 provided can also be from more than a dozen to a few dozen, for example. The present invention is also applicable as a storage system with three or more sites 1.

Among the plurality of sites 1, a constitution that is provided in disaster recovery is obtained by selecting and connecting three sites 1, for example. Basic patterns with a constitution that provides for disaster recovery include a cascade and multi-target constitutions, for example.

A cascade constitution is a constitution in which a plurality of sites 1 are connected using a cascade connection. In the case of a cascade constitution, the data stored at the primary site which is the starting point are transferred to and stored in a site that is adjacent to the primary site (relay site) and the data are transferred and stored in another site (remote site) that is adjacent to the relay site. A multi-target constitution is a constitution in which a plurality of sites 1 are connected using a star connection. The data stored in the primary site at the center are transferred to and stored in a first site (a closer remote site) and a second site (a more distant remote site).

In the case of either the cascade constitution or multi-target constitution, data in the primary site are also held in each of the other plurality of sites. Therefore, even in cases where the primary site stops as a result of a disaster or the like, work can be continued by using the other site.

The present invention comprises a design system 2 for constructing a disaster recovery constitution that comprises a plurality of sites 1 in a storage system. In this specification, a disaster recovery constitution is sometimes called an inter-site connection constitution.

The design system 2 is constituted comprising a plurality of functions and a plurality of tables. The plurality of functions include, for example, a site information acquisition section 2F1, a candidate pattern generation section 2F2, a user condition acquisition section 2F3, a candidate pattern evaluation section 2F4, a pattern selection section 2F5, and a document output section 2F6. The plurality of tables include, for example, a site information table 2T1, a basic pattern table 2T2, a candidate pattern table 2T3, a user condition table 2T4, and an applicable pattern table 2T5.

The site information acquisition section 2F1 which constitutes a 'site information acquisition section' acquires site information from within the storage system and generates a site information table 2T1. The details of the site information will be described subsequently in conjunction with FIG. 5 but include information related to the constitutions in each site and information related to the connections between the respective sites. Information related to the constitutions in the sites can include, for example, information related to the performance of the storage control devices (also called 'storage devices' hereinbelow) that are provided in the respective sites. The information related to the connections between sites can include, for example, information indicating the physical distances between the respective sites, the types of communication lines connecting the respective sites, and the speed and quality of the communication lines.

The candidate pattern generation section 2F2 generates candidate patterns for each predetermined index among the respective indices included in the site information table 2T1 on the basis of the site information table 2T1 and basic pattern table 2T2. The candidate patterns thus generated are stored in the candidate pattern table 2T3.

The basic pattern table 2T2 pre-stores a plurality of basic patterns for obtaining a disaster recovery constitution by connecting a plurality of sites 1 in the storage system. Basic patterns include the abovementioned cascade constitution and multi-target constitution. Further, the basic pattern table 2T2 presets lower limit values for each performance index which are considered to be the minimum to be secured for the disaster recovery constitution. For example, the basic pattern table 2T2 presets each value of the physical distance to be secured, the communication speed, the communication quality, the RPO (Recovery Point Objective), and the RTO (Recovery Time Objective).

The candidate pattern generation section 2F2 detects a candidate pattern that satisfies the performance index for each performance index. 'Candidate pattern' signifies the topology or connection order for connecting a plurality of sites. The candidate pattern generation section 2F2 generates, for example, candidate pattern that emphasize the physical distances between sites, candidate patterns that emphasize the speed of the communication lines between sites, candidate patterns that emphasize the communication quality, and candidate patterns that emphasize the RPO and RTO.

The user condition acquisition section 2F3 acquires the conditions desired by the user relating to the disaster recovery constitution. The user is able to set the desired conditions for all or some of the plurality of performance indices. For example, the user sets conditions for the physical distances between sites and the communication speeds and so forth that are to be kept at a minimum. The conditions input by the user are stored in the user condition table 2T4. In cases where the desired topology exists, the user is also able to select any one of a cascade constitution and a multi-target constitution.

The candidate pattern evaluation section 2F4 which constitutes the 'pattern evaluation section' evaluates the respective candidate patterns stored in the candidate pattern table 2T3 on the basis of user conditions that are stored in the user condition table 2T4 and detects an applicable pattern. In other words, the pattern evaluation section 2F4 extracts a combination (applicable pattern) that matches the desires of the user from among the possible plurality of combinations (candidate patterns). The extracted applicable patterns are stored in the applicable pattern table 2T5.

The number of applicable patterns differs depending on the set content of the user conditions and the constitution in the storage system (the intra-site constitution and inter-site connection constitution). In cases where the user conditions are too strict, there is the possibility that not a single applicable pattern will be detected. Further, in cases where the user conditions are too relaxed, there is the possibility that a multiplicity of applicable patterns will be detected. The user is able to change the user conditions while considering the detected number of applicable patterns.

The pattern selection section 2F5 selects anyone of the plurality of applicable patterns. For example, the extracted applicable pattern is presented to the user in conjunction with the respective performance indices of the applicable pattern. The user is able to select any one pattern from among the applicable patterns thus presented. The results of the selection by the user are stored. Even in cases where only one applicable pattern is detected, the user is under no obligation to select the only applicable pattern. The user can request the re-extraction of the applicable patterns by changing the conditions.

The document output section 2F6 generates and outputs the construction procedure 2D1 and the operating procedure 2D2 on the basis of the applicable pattern selected by the user. The construction procedure 2D1 is a document that records information for constructing the pattern selected by the user (disaster recovery constitution) in the storage system. The operating procedure 2D2 is a document that records information required to operate the constructed disaster recovery constitution. The document output section 2F6 uses pre-stored construction procedure templates and operating procedure templates to generate the respective procedures 2D1 and 2D2.

The respective procedures 2D1 and 2D2 can include not only text data and image data programs but also script programs and so forth. Hence, the construction procedure 2D1 is also able to call and change information used in the construction of the disaster recovery constitution and the operating procedure 2D2 is also able to call and change information that is used in the operation of the disaster recovery constitution.

The user sets the communication path between the designated sites or sets the communication path between the host and the logical volume on the basis of the content of the construction procedure 2D1. Further, the user performs the actual operation on the basis of the content of the operating procedure 2D2.

If the data are updated on the primary site, the updated data are transferred to and stored in the respective other sites. In cases where the primary site is stopped as a result of the occurrence of a fault, any of the other sites is used as a substitute for the primary site. In the site which becomes the substitute for the primary site, the host of the site takes over the task and processes requests from the client terminal.

This embodiment is able to relatively simply construct the disaster recovery constitution that satisfies the desires of the user in the storage system by means of the design system 2. Hence, the user is able to examine the disaster recovery constitution and shorten the time for the trial and error process in the design in order to improve user friendliness.

In this embodiment, procedures 2D1 and 2D2 for implementing the selected disaster recovery constitution are automatically created and output. Hence, the user is able to construct a disaster recovery constitution while looking at the respective procedures 2D1 and 2D2 and start the operation.

First Embodiment

Figure 2:
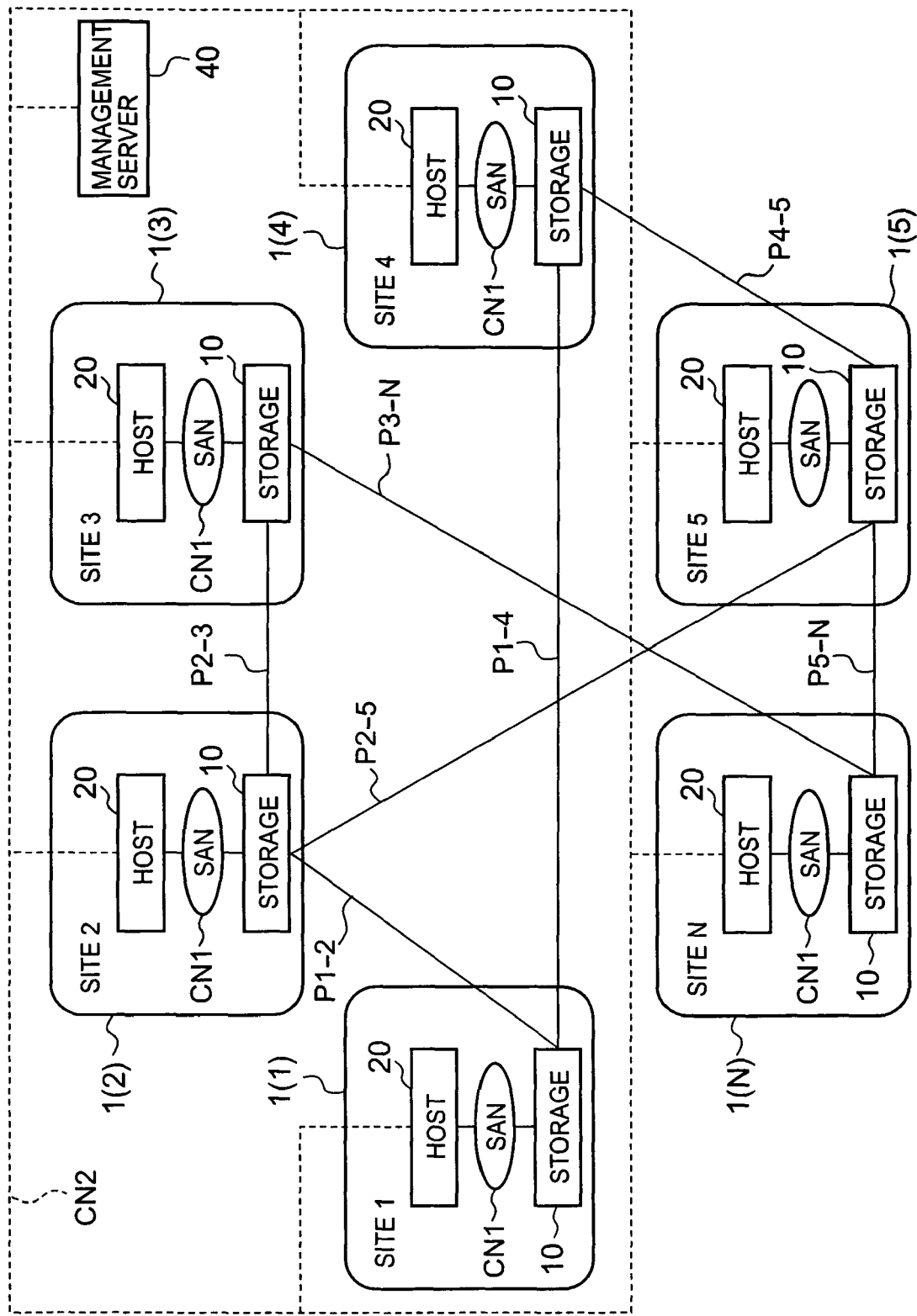
FIG. 2 is an explanatory diagram of the overall constitution of the storage system according to this embodiment.

FIG. 2 is an explanatory diagram showing the overall constitution of the storage system according to the present invention. The storage system comprises a plurality of sites 1 (1) to 1(N) (four or more, for example). In the following description, in cases where there is no particular need to distinguish the respective sites, the sites are referred to simply as 'sites 1'. The respective sites 1 can be disposed in different cities, for example. The respective sites 1 comprise a storage device 10 which constitutes a 'storage control device' and a host 20 which is a 'higher-level device'. The storage device 10 and host 20 are connected via an intra-site network CN1 such as a SAN (Storage Area Network), for example.

As indicated by FIG. 1, predetermined sites among the respective sites 1 are connected via a remote copy communication path P. The respective sites 1 are connected via a management network CN2 such as the Internet, for example. The respective sites 1 confirm the vitality of the other sites 1 via the network CN2.

A management server 40 can be connected to the management network CN2. The management server 40 is able to collect information from management terminals 30 in the respective sites 1 and deliver instructions to the respective management terminals 30. Tools for designing a disaster recovery constitution can be executed on the management server 40, for example. However, the design tools are not limited to the management server 40 and may also be executed on the management terminal 30 or executed on another computer that does not belong to the storage system.

Figure 3:
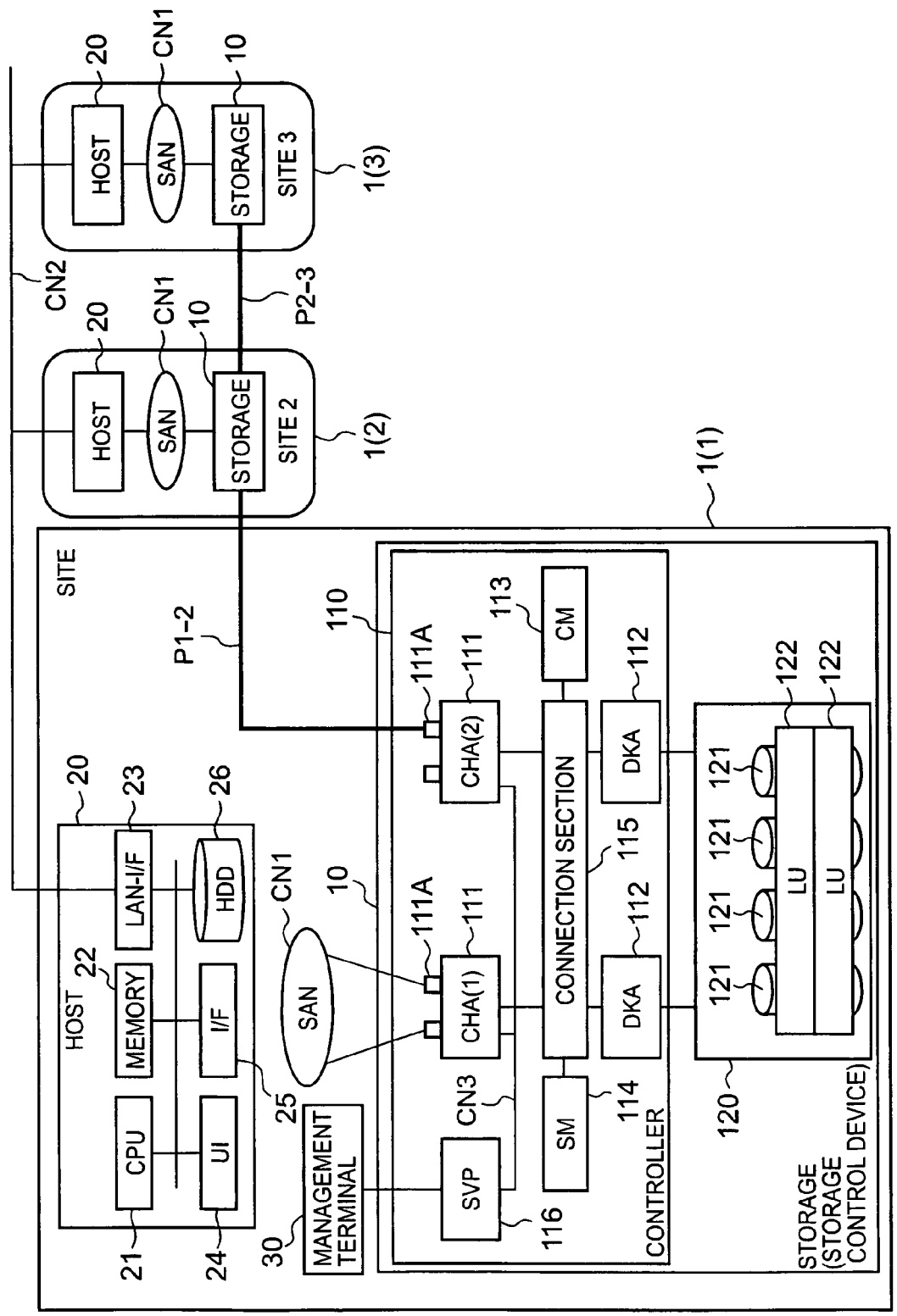
FIG. 3 is an explanatory diagram showing the constitution of storage devices and hosts.

FIG. 3 is an explanatory diagram that shows an example of the hardware constitution of the storage device 10 and host 20. The constitution of the host 20 will be described first. The host 20 is constituted as a computer device such as a server computer or mainframe machine, for example. The host 20 is constituted comprising, for example, a processor (CPU in FIG. 3) 21, a memory 22, a first communication section (LAN—I/F in FIG. 3) 23, a user interface section (UI in FIG. 3) 24, a second communication section (I/F in FIG. 3) 25, and an auxiliary storage device (HDD in FIG. 3) 26.

The processor 21 reads and executes computer programs that are stored in the memory 22 and auxiliary storage device 26 and so forth and, as a result, implements a predetermined function. The memory 22 or auxiliary storage device 26 stores programs such as an application program that uses the storage devices 10 and a program for managing the storage devices 10. The memory 22 or auxiliary storage device 26 is also able to store a variety of tables or the like that are used in order to recover from a remote copy fault (described subsequently).

The first communication section 23 exchanges management information with the host 20 of the other sites 1 via the management network CN2. Management information can include information for confirming the vitality of the other sites (heartbeat signal) and information that is used in the re-constitution of a copy path or the like.

The user interface section 24 comprises an information output section for providing the user with information and an information input section for receiving information from the user. Possible information output sections include, for example, display devices or speech output devices. Possible information input sections include, for example, keyboard switches, pointing devices, touch panels, and microphones.

The second communication section 25 performs communication with the storage devices 10 via the intra-site network CN1. The hosts 20 are able to write data to the storage devices 10 and read data from the storage devices 10 via the second communication section 25 and the intra-site network CN1.

The constitution of the storage device 10 will now be described. The storage device 10 is constituted comprising, for example, a controller 110 for controlling the operation of the storage device 10 and a storage section 120 that is controlled by the controller 110.

The controller 110 can be constituted comprising at least one or more channel adapters ('CHA' hereinbelow) 111, at least one or more disk adapters ('DKA' hereinbelow) 112, at least one or more cache memories ('CM' in FIG. 3) 113, at least one or more shared memories ('SM' in FIG. 3) 114, a connection section 115, a service processor ('SVP' hereinbelow) 116, and a storage section 120.

The CHA 111 is an upper communication control section for exchanging data with the host 20 that can be constituted comprising a microprocessor and local memory or a data transfer circuit or the like, for example. The CHA 111 comprises a communication port 111A.

One CHA (1) 111 is used to process communications with the host 20. The communication port 111A of the CHA (1) 111 is a target port that is connected to the second communication section 25 of the host 20 via the network CN1.

The other CHA (2) 111 is used to process communications with the storage device 10 in the other site 1. In other words, the CHA (2) 111 is used to perform a remote copy.

The DKA 112 is a lower communication control section for exchanging data with the storage section 120 and can be constituted comprising, for example, a microprocessor, local memory, and a data transfer circuit or the like. The DKA 112 may also be constituted as a control substrate that is distinct from the CHA 111 or the functions of the CHA 111 and the functions of the DKA 112 can also be mixed on the same control substrate.

The cache memory 113 is a memory for storing data received from the host 20 and temporary management information and so forth, for example. The shared memory 114 is a memory for storing various control information for controlling the storage devices 10, for example. Part of the control information is also copied to the local memory in the CHA 111 and the local memory in the DKA 112. Control information can also include a table or the like (described subsequently).

The cache memory 113 and shared memory 114 may be constituted as separate memory substrates or the cache memory 113 and shared memory 114 may be mixed on the same memory substrate.

The connection section 115 serves to mutually connect the respective CHA 111, the respective DKA 112, the cache memory 113, and the shared memory 114. The connection section 115 is constituted as a bus or crossbar switch or the like, for example.

The SVP 116 monitors the various states of the storage device 10 and rewrites the control information in accordance with instructions from the management terminal 30. The SVP 116 is connected to each of the CHA 111 via the intra-device network CN3, for example. The SVP 116 is able to obtain information such as information on the DKA 112 or shared memory 114 via either one of the CHA 111. A constitution in which the SVP 116 is connected to the respective CHA 111 and respective DKA 112 by the intra-device network CN3 is also possible.

The storage section 120 comprises a plurality of disk drives 121. The disk drives 121 correspond to 'storage devices'. Possible disk drives 121 include, for example, hard disk drives, semiconductor memory drives (including flash memory devices), holographic memory drives, optical disk drives, magneto-optical disk drives, magnetic tape drives, and so forth.

At least one or more logical storage areas can be generated by virtualizing the physical storage areas that the disk drive 121 comprises. These logical storage areas are called logical volumes 122. The host 20 accesses the logical volumes 122 as access targets.

The operation in the storage device 10 will be described simply first. In cases where the host 20 issues a read command, the CHA 111 confirms whether the data requested by the host 20 exist in the cache memory 113. In cases where these data are stored in the cache memory 113, the CHA 111 read the data from the cache memory 113 and transmit same to the host 20.

In contrast, in cases where the data requested by the host 20 do not exist in the cache memory 113, the CHA 111 issues a request to read data to the DKA 112. The instruction from the CHA 111 to the DKA 112 is made via the shared memory 114. Upon finding the instruction from the CHA 111, the DKA 112, which references the shared memory 114 at any time, reads the data from the disk drive 121 and stores the data in the cache memory 113. Processing to copy the data stored in the disk drive 121 to the cache memory 113 is called staging processing. The end of staging processing is reported to the CHA 111 via the shared memory 114. During staging, the DKA 112 converts physical addresses into logical addresses (LBA: Logical Block Addresses). For disk drives 121 that have not been accessed for a predetermined time or more, for example, the supply of power can be stopped and the speed can be reduced. The consumed power of the storage section 120 can accordingly be reduced.

In cases where the host 20 issues a write command, the CHA 111 confirms the spare capacity of the cache memory 113 and, in cases where write data can be received, write data are received from the host 20. The CHA 111 stores the received write data in the cache memory 113. Further, the CHA 111 instructs the DKA 112 to write the data to the logical volume 122. This instruction is made via the shared memory 114. By transmitting various instructions and reports via the shared memory 114, a plurality of CHA 111 and DKA 112 can be made to operate independently in parallel using a relatively simple constitution.

Upon finding the write command via the shared memory 114, the DKA 112 writes write data that are stored in the cache memory 113 to the logical volume 122. More precisely, the DKA 112 converts the logical address of the write data into a physical address and stores the write data at a predetermined point of the disk drive 121 that constitutes the write destination logical volume 122. In cases where the logical volume has a RAID configuration, the write data are written scattered between a plurality of disk drives 121. A transfer of data from the cache memory 113 to the disk drives 121 is called de-staging processing. The end of de-staging processing is reported to the CHA 111 via the shared memory 114.

The CHA 111 reports the fact that the processing of a write command to the host 20 is complete.

Further, the de-staging processing can be performed with suitable timing on the basis of the spare capacity of the cache memory 113 and the processing load of the storage device 10 and so forth. There is no need to perform the de-staging processing immediately when a write command is received. A system that involves reporting the end of the write command processing to the host 20 after the de-staging processing is complete is called a synchronous system and a system that involves reporting the end of the write command processing to host 20 prior to completion of the de-staging processing is called an asynchronous system.

In cases where the write destination of the write command that is issued by the host 20 is the logical volume 122 constituting the remote copy target, the write data received from the host 20 is also transmitted to a copy destination volume that is pre-established as a remote copy pair rather than being stored in the write-target logical volume 122. The CHA 111 associates a sequence number with the write command and write data from the host 20 before transmitting the latter to the remote copy destination logical volume 122 (logical volume that exists in another site).

The management terminal 30 is a computer device for instructing a constitutional change to the storage device 10, collecting the internal state of the storage device 10 and displaying this state on a terminal screen, for example. The management terminal 30 is connected to the management server 40 via the communication network CN2. The management terminal 30 supplies an instruction to the storage device 10 via the SVP 116 and acquires information from the storage device 10. A function for managing the storage devices 10 can also be provided in the host 20.

The copying of data between the sites 1 can be executed using two methods. The first method is a method that involves transferring data in block units from a copy source storage device 10 to a copy destination storage device 10. In the first method, for example, the FC protocol and iSCSI protocol and so forth, for example can be used. The second method is a method in which the copy source host 20 reads data from the copy source storage device 10 and transfers the data in file units to a copy destination host 20. The copy destination host 20 stores the data received in file units in the copy destination storage device 10. In this case, a protocol such as the TCP/IP (Transmission Control Protocol/Internet Protocol), for example, can be used.

Figure 4A:
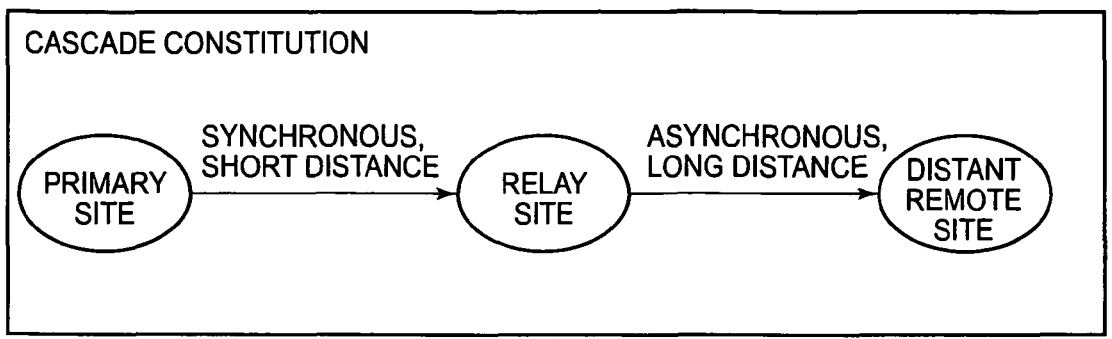
FIG. 4 is an explanatory diagram of a basic pattern of a disaster recovery constitution.
Figure 4B:
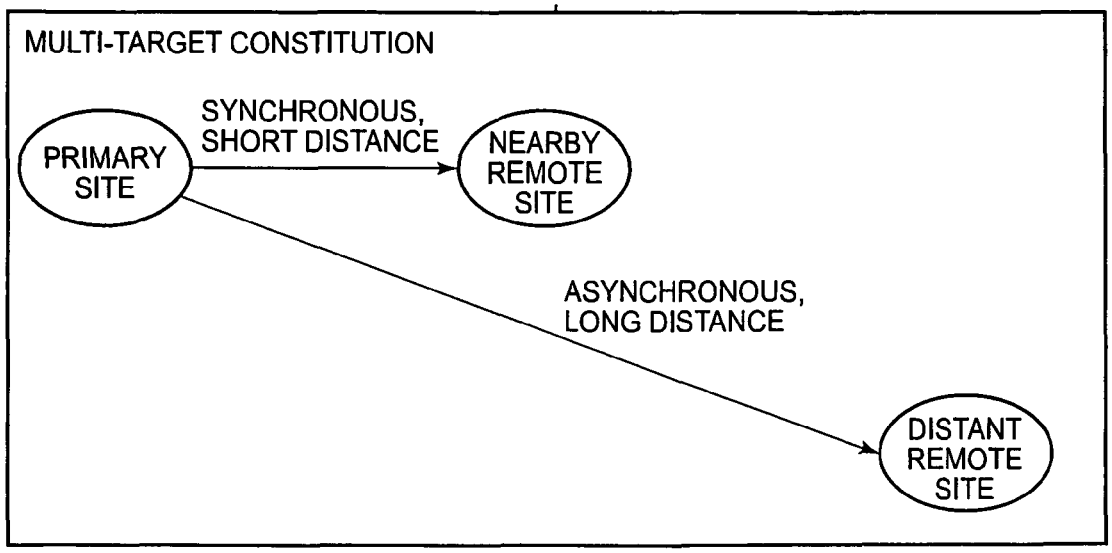

FIG. 4 is an explanatory diagram that shows the basic pattern of the disaster recovery constitution that is constructed in the storage system. The basic patterns of the disaster recovery constitution (topology) include the cascade constitution shown in FIG. 4A and the multi-target constitution shown in FIG. 4B. However, the present invention is not limited to the illustrated examples.

The cascade constitution is constituted such that a primary site has a cascade connection with a relay site and distant remote site. The primary site is the starting point of the data copy. The relay site is installed close to the primary site and transfers data received from the primary site to the distant remote site. The distant remote site is installed in a place that is spaced remotely from the primary site and relay site. Thus, the physical distance between the primary site and relay site is set relatively short and the physical distance between the primary site and the relay site and the distant remote site is set relatively long. A data copy is executed between the primary site and relay site which have a short physical distance therebetween by using the synchronous system. A data copy is made between the relay site and distant remote site which have a long physical distance therebetween by using the asynchronous system.

The multi-target constitution is constituted by using a star connection to connect the primary site and the nearby remote site and distant remote site. The nearby remote site is disposed relatively close to the primary site. The distant remote site is installed in a place that is spaced remotely apart from the primary site. A data copy between the primary site and nearby remote site is executed by using the synchronous system. A data copy between the primary site and distant remote site is made by using the asynchronous system.

FIG. 5 is an explanatory diagram showing a constitutional example of a site information table T1. The site information table T1 can be stored in the management server 40, for example. The site information table T1 stores information relating to the constitution of the storage system. The information relating to the constitution of the storage system includes information relating to the constitution of the storage system, information relating to the constitution in each site, and information relating to the connection between the respective sites. In FIG. 5, 'site' is sometimes displayed as 'DC'.

Possible information relating to the intra-site constitution includes, for example, information relating to the performance of the storage device 10 and address information for a connection to the host 20 and storage device 10. In FIG. 5, address information is expediently omitted but address information such as the WWN (World Wide Name) and IP address are managed by site information table T1.

Possible information relating to the inter-site connections includes, for example, the physical distance between the other sites, the types of communication lines established between the other sites, and the speed and quality of the communication lines. A quality of the communication lines is the effective speed, for example.

FIG. 6 is an explanatory diagram showing a constitutional example of the user condition table T2. The user condition table T2 can be stored in the management server 40, for example. The user condition table T2 stores the conditions desired by the user that relate to the disaster recovery constitution. The user condition table T2 comprises, for example, a primary site designation field, a basic pattern designation field, a field designating the inter-site distance, a field designating the type of inter-site connection (the type of communication line), a site designating the quality of the communication line, a site designating the speed of the communication line, and fields that designate the RPO and RTO values. The user is also able to establish values for all of the fields and establish values only for some of the fields. Further, the user is also able to establish a plurality of values in the same field. For example, a first candidate site name and a second candidate site name can be established for the primary site. Furthermore, a first desired basic pattern and a second desired pattern can be established as the basic patterns.

FIG. 7 is an explanatory diagram that shows a constitutional example of the basic pattern table T3. The basic pattern table T3 can be stored in the management server 40, for example. The basic pattern table T3 stores the minimum specifications that a cascade constitution and multi-target constitution should each have.

For example, the basic pattern table T3 comprises a table T31 that prescribes the physical distance between the respective sites of a cascade constitution. Table T31 establishes the physical distance between the primary site and relay site and the physical distance the relay site and distant remote site that are connected in a cascade constitution. The basic pattern table T3 comprises a table T32 for prescribing the physical distance between the respective sites in a multi-target constitution. Table T32 establishes the physical distance between the primary site and nearby remote site and the physical distance between the primary site and distant remote site. In addition, the basic pattern table T3 comprises a table T33 for prescribing the minimum specifications. This table T33 establishes, for each basic pattern (topology), the minimum communication speed and minimum communication quality that the inter-site communication lines are supposed to have and the minimum RTO and RPO values that are to be secured. For the sake of convenience, a case where the basic pattern table T3 is constituted by the three tables T31 to T33 is exemplified but the basic pattern table T3 can also be constituted as one table instead.

Figure 8:
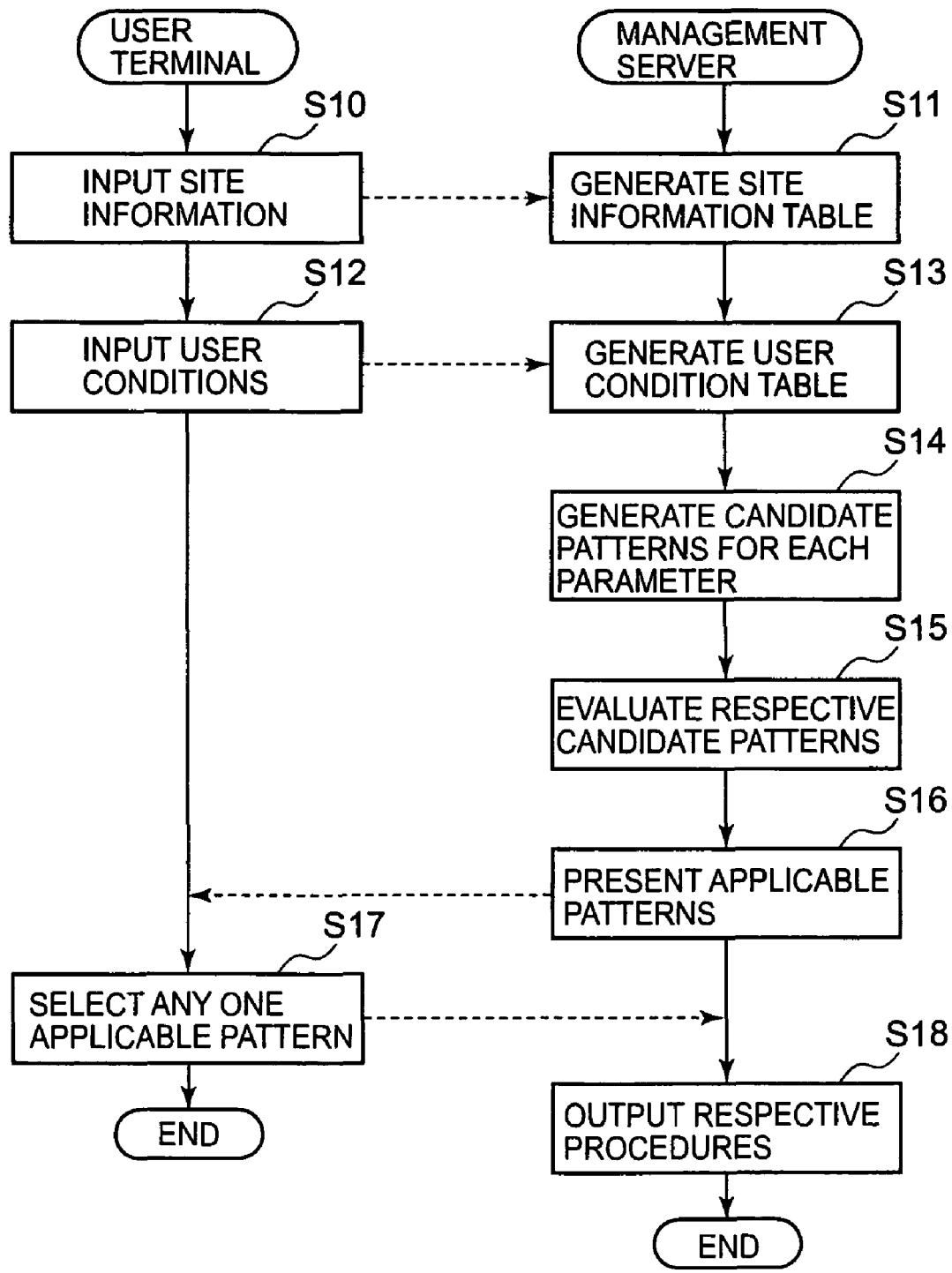
FIG. 8 is a flowchart that shows the flow of the overall processing for designing the disaster recovery constitution.

FIG. 8 is a flowchart showing the overall processing for designing the disaster recovery constitution. The respective flowcharts that are to be mentioned hereinbelow provide an overview of the respective processes to an extent that permits an understanding and implementation of the present invention and sometimes differs from an actual computer program. A so-called person skilled in the art is able to change the steps in the flowchart to different steps, switch the order of the steps, and add new steps and so forth.

Prior to using the design system, the user accesses the management server 40 via the user terminal and inputs the site information (S10). The management server 40 generates a site information table T1 based on the site information input from the user terminal (S11). Thereafter, the user inputs user conditions (S12) and the management server 40 generates the user condition table T2 based on the user conditions thus input (S13).

The management server 40 uses the site information table T1 to generate the candidate pattern table for the respective parameters (S14). The respective parameters are indices relating to the performances and so forth of the disaster recovery constitutions that appear in the site information table T1 and user condition table T2 and so forth. The management server 40 evaluates the respective candidate patterns, extracts the applicable pattern (S15), and displays the extracted applicable pattern on the user terminal (S16).

The user selects any one of the applicable patterns presented by the management server 40 (S17). The management server 40 generates and outputs a construction procedure and operating procedure based on the result of the selection by the user (S18).

Figure 9:
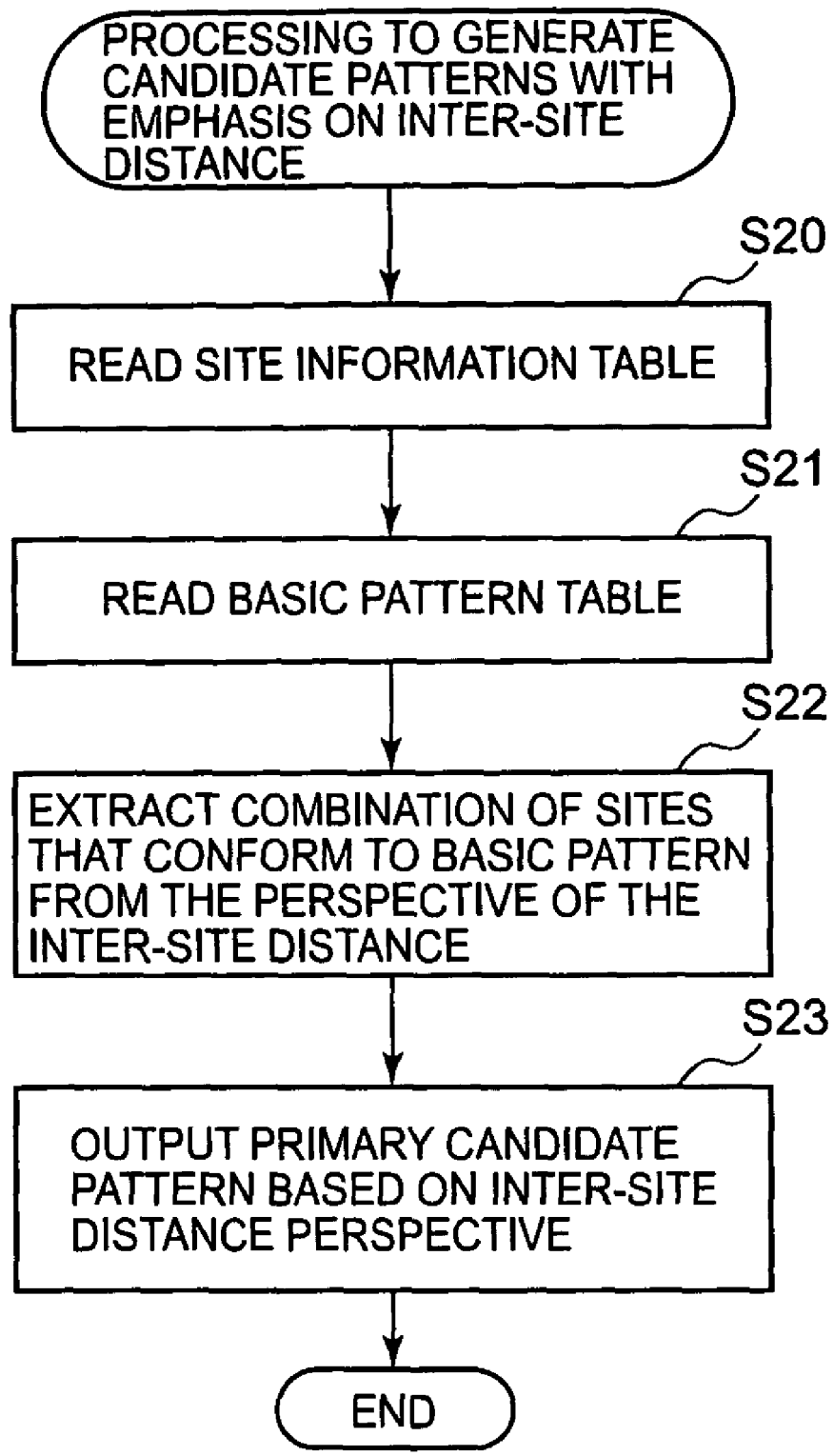
FIG. 9 is a flowchart that shows processing to generate a candidate pattern from the perspective of the physical distance between sites.

The processing to generate a candidate pattern indicated by S14 in FIG. 8 will now be described based on FIGS. 9 to 13. FIG. 9 is a flowchart showing processing to generate a candidate pattern with an emphasis on parameters such as the physical distance between sites.

The management server 40 reads the site information table T1 and basic pattern table T3 (S20, S21) and extracts all of the combinations of sites that are compatible with the basic pattern from the perspective of the inter-site physical distance (S22). The extracted candidate patterns are output as primary candidate patterns. The management server 40 stores primary candidate patterns as shown in FIG. 10 in the primary candidate pattern table T4 (S23). The primary candidate pattern table T4 associates and stores, for example, pattern numbers, basic pattern types, primary site names, relay site names, nearby remote site names, and distant remote site names.

That is, in the processing shown in FIG. 9, all of the combinations of sites capable of generating the cascade constitution and multi-target constitution are extracted based on the physical distances between the respective sites stored in the site information table T1. As described by basic pattern table T3, the a cascade constitution and multi-target constitution cannot be generated unless the sites are sites that are less than a predetermined distance apart or a predetermined distance or more apart. Hence, the management server 40 judges the physical distance between the respective sites that are stored in the site information table T1 based on the distance defined by the basic pattern table T3 and judges whether the cascade constitution or multi-target constitution can be generated. Further, the management server 40 extracts candidate patterns that permit a cascade constitution and candidate patterns that permit a multi-target constitution. The extracted candidate patterns are a population for extracting candidate patterns based on other parameters.

Figure 11:
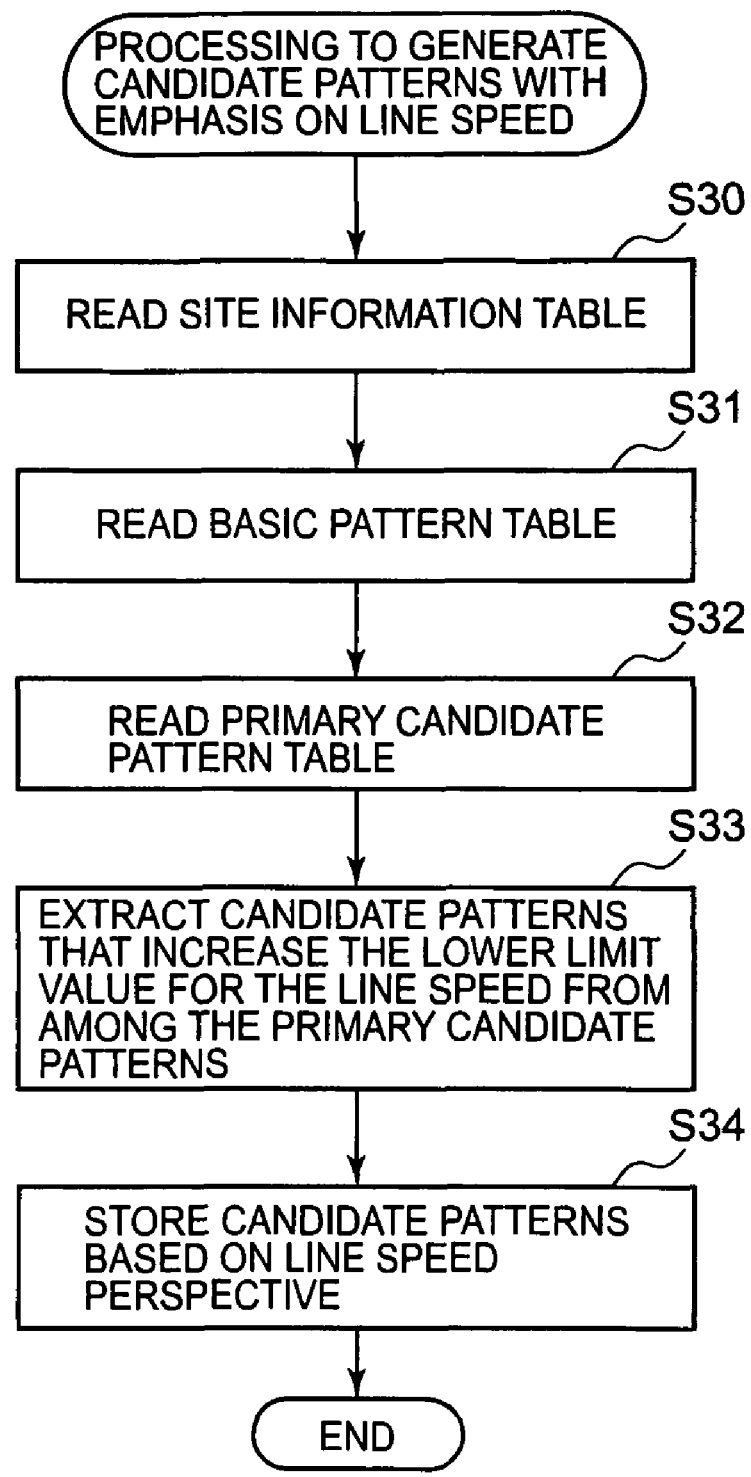
FIG. 11 is a flowchart that shows processing to generate a candidate pattern from the perspective of the communication speed.

FIG. 11 is a flowchart showing processing to generate candidate patterns with an emphasis on the inter-site communication speed. The management server 40 reads the site information table T1, basic pattern table T3 and primary candidate pattern table T4 (S30, S31, S32). The management server 30 extracts only those patterns from among the primary candidate patterns which raise the lower limit value for the communication speed that are stored in the basic pattern table T3 (S33) and stores these patterns (S34).

Figure 12:
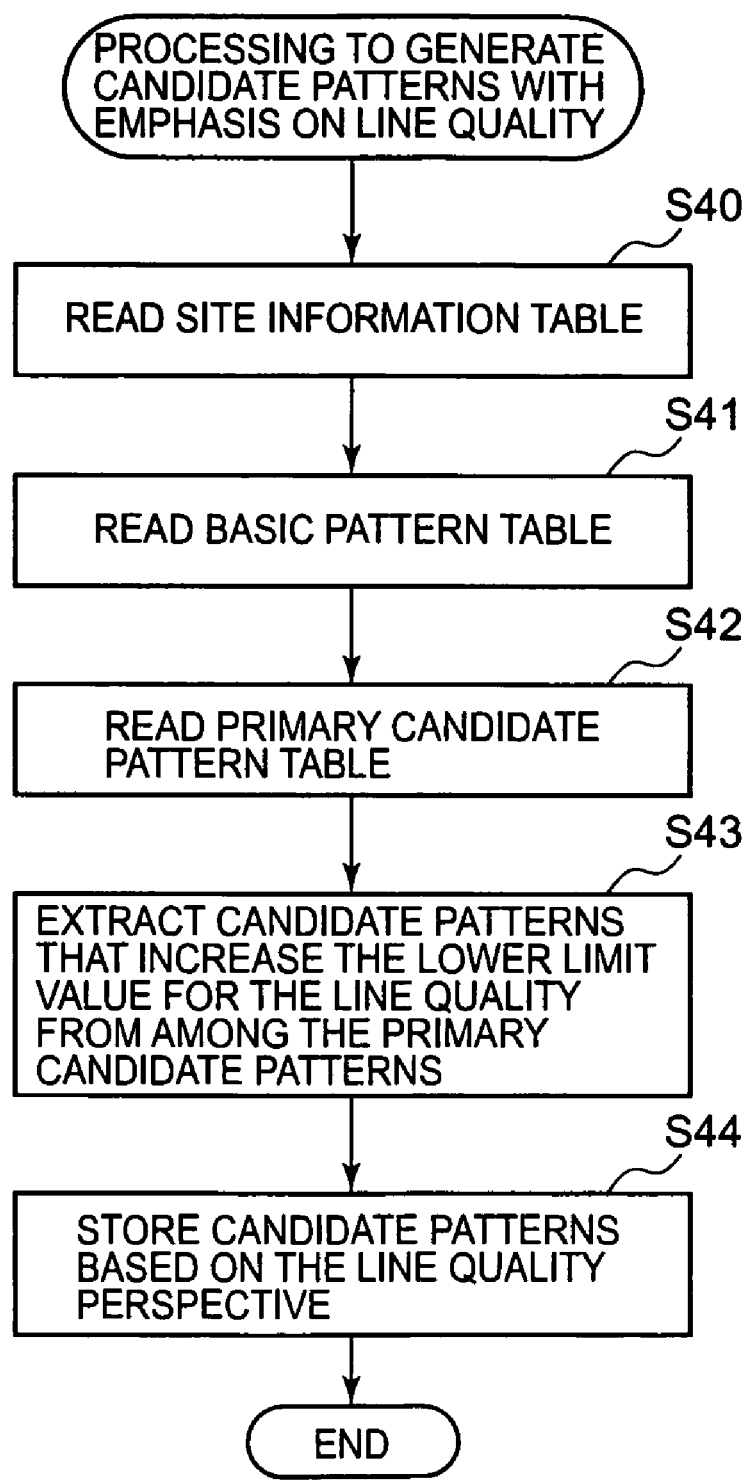
FIG. 12 is a flowchart that shows processing to generate a candidate pattern from the perspective of the communication quality.

FIG. 12 is a flowchart showing the processing to generate the candidate patterns with an emphasis on the inter-site communication quality. The management server 40 reads the site information table T1, basic pattern table T3, and primary candidate pattern table T4 (S40, S41, S42). The management server 30 extracts only those patterns that raise the lower limit value of the communication quality stored in the basic pattern table T3 from among the primary candidate patterns (S43) and stores these patterns (S44).

Figure 13:
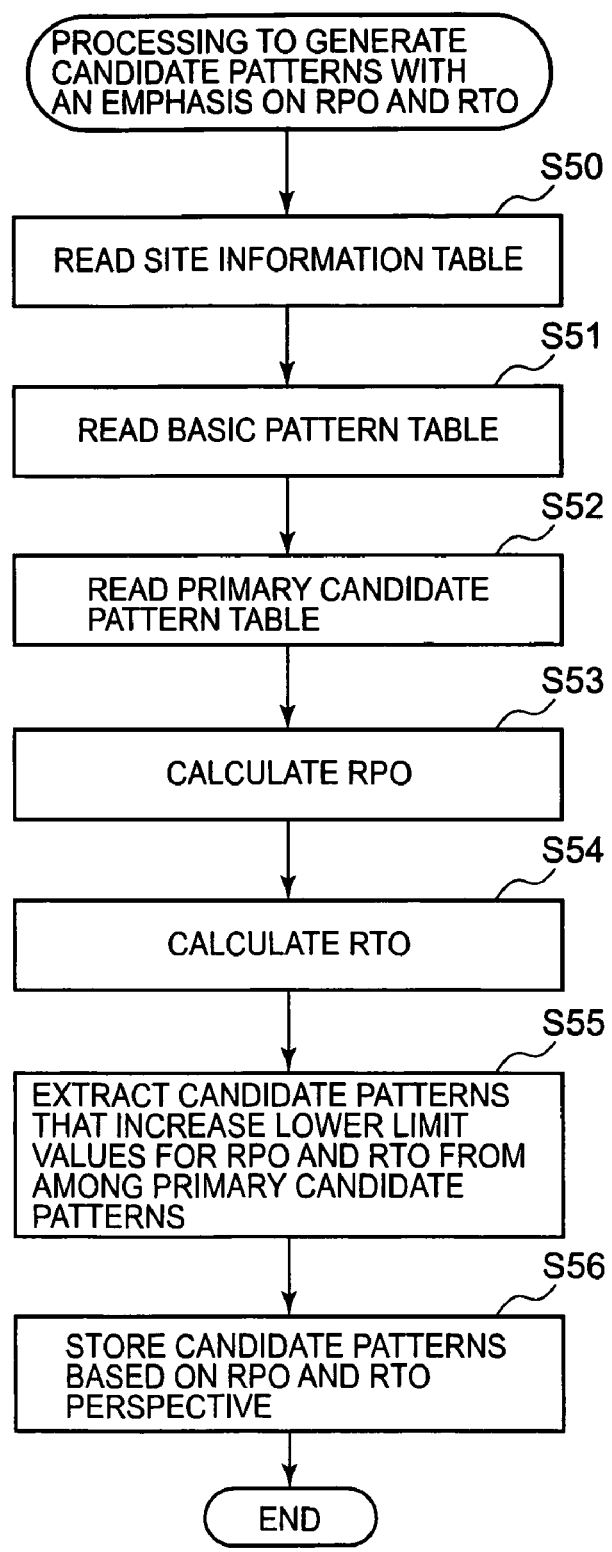
FIG. 13 is a flowchart that shows processing to generate a candidate pattern from the perspective of the RPO and RTO.

FIG. 13 is a flowchart showing the processing for generating candidate patterns with an emphasis on the RPO and RTO. The management server 40 reads the site information table T1, the basic pattern table T3, and the primary candidate pattern table T4 (S50, S51, S52). The management server 40 calculates the RPO and RTO based on the data in the tables thus read (S53, S54). The RPO and RTO values are estimated values. The management server 40 extracts only those patterns which raise the lower limit value of the RPO and the lower limit value of the RTO from among the primary candidate patterns (S55) and stores these patterns (S56).

Figure 14:
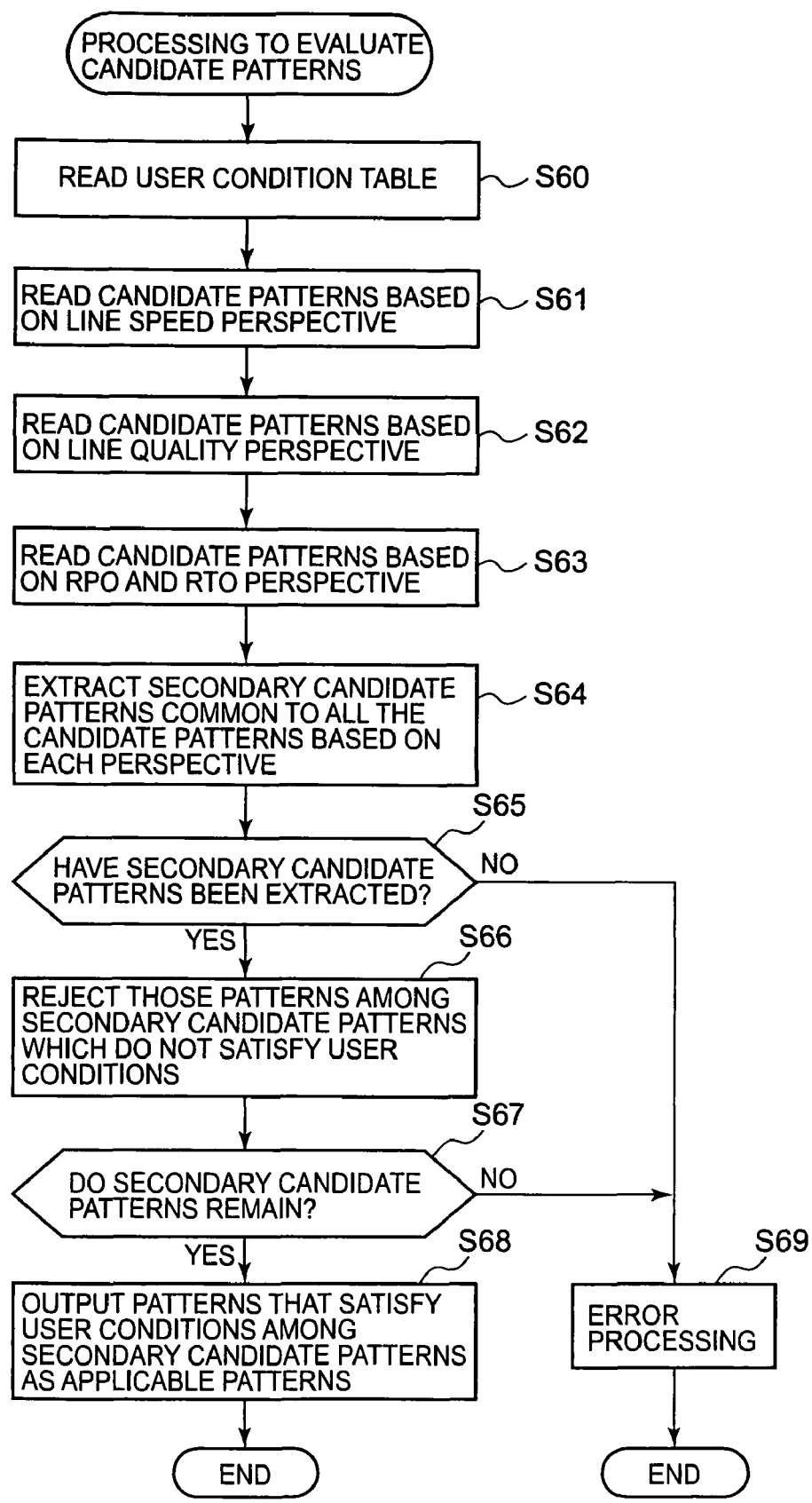
FIG. 14 is a flowchart that shows processing to evaluate a candidate pattern.

FIG. 14 is a flowchart showing the processing for evaluating the candidate patterns shown in S15 in FIG. 8. The management server 40 reads the user condition table T2 (S60). Thereafter, the management server 40 reads the candidate patterns which are extracted from the perspective of the communication speed (S61), the candidate patterns extracted from the perspective of the communication quality (S62), and the candidate patterns extracted from the perspective of the RPO and RTO (S63).

The management server 40 extracts the candidate patterns that are common to all these perspectives as secondary candidate patterns (S64). That is, the logical sum of a set of candidate patterns extracted for each of the perspectives is found and the patterns common to all these perspectives are extracted. The management server 40 judges whether the secondary candidate patterns have been extracted (S65).

In cases where one or more secondary candidate patterns have been extracted (S65: YES), the management server 40 rejects those patterns that did not satisfy the user conditions among the secondary candidate patterns (S66). The management server 40 judges whether these patterns are secondary candidate patterns that satisfy the user conditions (S67). In cases where secondary candidate patterns that satisfy the user conditions exist (S67: YES), the management server 40 outputs the secondary candidate patterns as applicable patterns (S68).

In contrast, in cases where it has not been possible to extract even one secondary candidate pattern (S65: NO) or in cases where there is not one secondary candidate pattern satisfying the user conditions (S67: NO), the management server 40 executes error processing (S69). In the error processing, an error message such as 'Patterns matching the desired conditions cannot be found. Please change the desired conditions or the constitution of the storage system', for example, is displayed on the user terminal.

FIG. 15 is an explanatory diagram showing Table T15 that stores an applicable pattern. The applicable pattern table T15 stores, for example, pattern numbers, primary site names, nearby remote site names, relay site names, distant remote site names, communication line quality values, communication speed values, and the respective RPO and RTO values. The content of table T15 is transmitted to and displayed on the user terminal (S16 in FIG. 8).

Figure 16:
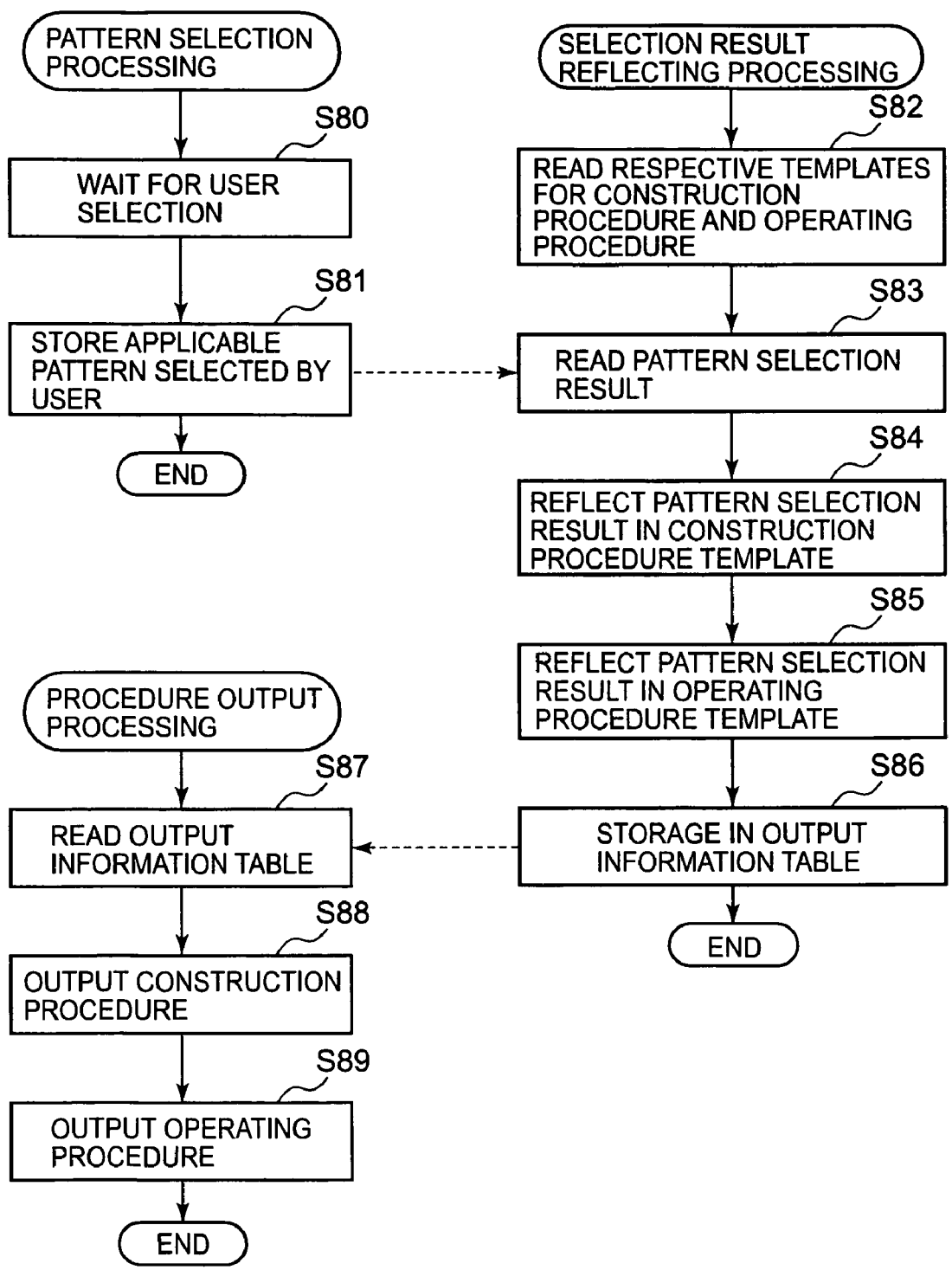
FIG. 16 is a flowchart that shows pattern selection processing, selection result reflecting processing, and procedure output processing.

FIG. 16 is a flowchart showing the details of S17 and S18 in FIG. 8. FIG. 16 shows pattern selection processing, selection result reflecting processing and procedure output processing. The pattern selection processing will now be described. The management server 40 waits until any one applicable pattern has been selected by the user (S80). If a selection instruction from the user has been input, the management server 40 stores the selected applicable pattern (S81).

The selection result reflecting processing will be described next. The management server 40 reads construction procedure templates and operating procedure templates (S82) and reads the result selected by the user (S83). Here, the pattern selection result includes, for example, information relating to the respective sites constituting the applicable pattern selected by the user and address information for connecting sites, for example.

The management server 40 reflects the pattern selection results in the construction procedure template and operating procedure template (S84, S85) and stores the pattern selection results in the output information table (S86). The output information table stores data that reflects the pattern selection result in each template.

The procedure output processing will be described next. The management server 40 reads the output information table (S87) and generates and outputs the construction procedure and operating procedure (S88, S89).

In this embodiment with such a constitution, a disaster recovery constitution that satisfies the desires of the user can be provided relatively simply in the storage system, whereby user labor can be reduced and user friendliness can be improved.

In this embodiment, in order to automatically generate the construction procedure and operating procedure, the user is able to easily construct and operate a disaster recovery constitution based on the respective procedures, whereby user friendliness improves.

In this embodiment, because candidate patterns based on other parameters (communication speed, communication quality, RPO and RTO) are extracted from among primary candidate patterns generated from the perspective of the physical distances between sites, the processing can be simplified.

Second Embodiment

The second embodiment of the present invention will now be described based on FIG. 17. This embodiment corresponds to a modified example of the first embodiment. In this embodiment, the management server 40 continually monitors changes to the constitution of the storage system in order to keep the site information table T1 in the latest state.

Figure 17:
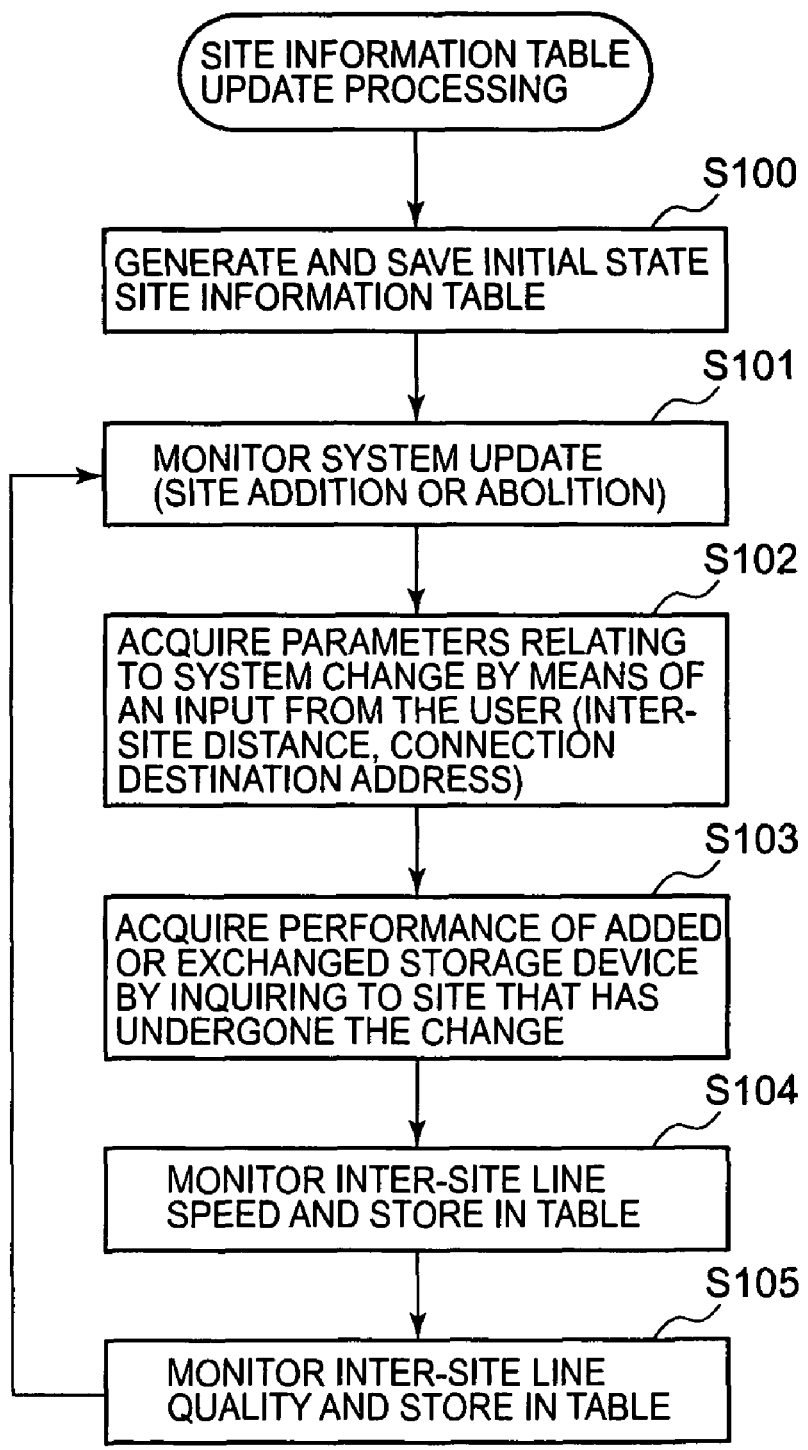
FIG. 17 is a flowchart that shows processing for updating the site information table that is executed by the storage system of a second embodiment.

FIG. 17 is a flowchart showing the processing to update the site information table T1 which is executed by the management server 40. The management server 40 first generates and stores a site information table T1 based on the initial state of the storage system (S100). The initial site information table T1 is generated based on the site information that is input from the user terminal, for example.

The management server 40 monitors whether changes to the constitution in the storage system have occurred (S101). Constitutional changes can include, for example, the addition of new sites, the withdrawal of existing sites, changes to the specifications of the inter-site communication lines, and changes to the constitution within existing sites. Changes to constitution within existing sites include the switching of the storage devices 10 and hosts 20 and the addition of storage devices 10 and hosts 20 and so forth. Such constitutional changes are spontaneously reported by the sites to which constitutional changes have been made to the management server 40. Alternatively, it may be detected whether there has been a constitutional change by means of regular or irregular inquiries by the management server 40. The constitution may also be such that the existence of constitutional changes is detected in accordance with an instruction from the user terminal.

The management server 40 acquires the connection destination address information and values for the physical distances between sites or other values, for example, among the parameters relating to constitutional changes to the storage system in accordance with inputs from the user terminal and stores the information and values in the site information table T1 (S102).

In cases where there is an added or exchanged storage device 10, the management server 40 issues an inquiry to the sites to acquire the performance of the storage device 10 and stores the performance in the site information table T1 (S103). The management server 40 monitors the inter-site communication speed and stores the detected communication speed in the site information table T1 (S104). In addition, the management server 40 monitors the quality of the inter-site communication and stores the detected communication quality in the site information table T1 (S105).

This embodiment with this constitution affords the same results as the first embodiment. In this embodiment, because the management server 40 keeps the stored content of the site information table T1 updated, the time taken to design the disaster recovery constitution can be shortened.

Moreover, the present invention is not limited to or by the above embodiments. A person skilled in the art is able to make a variety of additions or modifications within the scope of the present invention. The respective embodiments can be suitably used in combination, for example.

What is claimed is:

1. A storage system having a plurality of sites, comprising a CPU and a memory having a computer executable program stored thereon, wherein execution of the program implements a plurality of functions, including;

a site information acquisition section that acquires site information including information relating to the constitution in the respective sites and information relating to the connections between the respective sites, and that generates a site information table and stores the site information table in the memory;

a user condition acquisition section that acquires user conditions that are input by a user and generates a user condition table and stores the user condition table in the memory;

a candidate pattern generation section that generates candidate patterns obtained by using a predetermined topology to connect a plurality of sites that are selected among the respective sites on the basis of the site information table and a basic pattern table for storing patterns of a basic connection constitution of a plurality of sites in the memory;

a pattern evaluation section that evaluates the candidate patterns on the basis of the user conditions and detects applicable patterns; and a pattern selection section that selects, in cases where a plurality of the applicable patterns are detected, any one of the respective applicable patterns;

wherein the CPU executes processing of the site information acquisition section, the user condition acquisition section, the candidate pattern generation section, the pattern evaluation section and the pattern selection section.

2. The storage system according to claim 1, further comprising: a document output section that generates a predetermined document by reflecting data relating to the pattern that is selected by the pattern selection section in pre-prepared template data.

3. The storage system according to claim 1, wherein the information relating to the connections between the respective sites includes information relating to a plurality of predetermined indices that are preset; and the candidate pattern generation section generates the respective candidate patterns for each of the respective predetermined indices.

4. The storage system according to claim 3, wherein the candidate pattern generation section generates candidate patterns for other indices that differ from the respective predetermined indices on the basis of the information relating to the respective predetermined indices.

5. The storage system according to claim 3, wherein at least one of the respective predetermined indices is a first index and the others are second indices; and the candidate pattern generation section generates primary candidate patterns relating to the first index and generates candidate patterns for each of the second indices on the basis of the primary candidate patterns and the respective second indices.

6. The storage system according to claim 3, wherein the pattern evaluation section extracts, as secondary candidate patterns, candidate patterns that conform to all of the respective predetermined indices among the respective candidate patterns generated for each of the respective predetermined indices, and rejects secondary candidate patterns that do not conform to the user conditions among the secondary candidate patterns.

7. The storage system according to claim 3, wherein the predetermined indices include at least any or a plurality of a physical distance between the respective sites, a type of communication lines between the respective sites, a communication speed between the respective sites, and a quality of communication between the respective sites.

8. The storage system according to claim 4, wherein the predetermined indices include a physical distance between the respective sites, a communication speed between the respective sites, and a quality of communication between the respective sites; and the other indices include at least one of a recoverable time point index that indicates a recoverable time point and a required recovery time index that indicates the time required for recovery from a fault.

9. The storage system according to claim 3, wherein the predetermined indices include a physical distance between the respective sites, a communication speed between the respective sites, and a quality of communication between the respective sites;

the other indices include a recoverable time point index that indicates a recoverable time point and a required recovery time index that indicates the time required for recovery from a fault; and the physical distance between the sites is a first index and the respective other indices are second indices; and the candidate pattern generation section generates primary candidate patterns relating to the first index and generates candidate patterns for each of the second indices based on the primary candidate patterns and the respective second indices.

10. A method implemented in a CPU and a memory having a computer executable program stored thereon for designing a disaster recovery constitution in a storage system having a plurality of sites, the method comprising the CPU executing the program that includes the steps of:

acquiring site information including information relating to the constitution in the respective sites and information relating to the connections between the respective sites;

generating a site information table based on the site information and storing the site information table in the memory;

acquiring user conditions desired by a user relating to a disaster recovery;

generating a user condition table based on the user conditions and storing the user condition table in the memory;

generating candidate patterns obtained by using a predetermined topology to connect a plurality of sites that are selected from among the respective sites based on the site information table and a basic pattern table for storing patterns of a basic connection constitution of a plurality of sites in the memory;

evaluating the candidate patterns based on the user conditions and detecting applicable patterns; and selecting, in cases where a plurality of the applicable patterns are detected, any one of the respective applicable patterns.

11. The method for designing a disaster recovery constitution according to claim 10, wherein (1) the site information includes a performance of a storage control device in the site, address information, a physical distance between the respective sites, a communication speed between the respective sites, and a quality of the communication between the respective sites, (2) the step of generating candidate patterns involves executing the steps of:

generating primary candidate patterns that conform to the basic pattern from the perspective of the physical distance between the sites;

extracting primary candidate patterns at or more than a preset minimum communication speed among the primary candidate patterns;

extracting primary candidate patterns with no less than a preset minimum communication quality among the primary candidate patterns;

calculating a recoverable time point index that indicates a recoverable time point on the basis of the site information;

calculating a required recovery time index that indicates the time required for recovery from a fault on the basis of the site information; and extracting primary candidate patterns at or more than the minimum recoverable time point and minimum required recovery time which are preset among the primary candidate patterns, and (3) the step of detecting applicable patterns involves executing the steps of:

detecting secondary candidate patterns by calculating a logical sum of primary candidate patterns which are generated from the perspective of the physical distance between the sites, primary candidate patterns at or more than the minimum communication speed, primary candidate patterns with no less than the minimum communication quality, and primary candidate patterns at or more than the minimum recoverable time point and the minimum required recovery time; and rejecting patterns which do not conform to the user conditions among the secondary candidate patterns and outputting the remaining patterns as compatible patterns.

12. The method for designing a disaster recovery constitution according to claim 10, further comprising the step of creating a construction procedure for constructing the selected pattern in the storage system and an operating procedure for operating the selected pattern, by reflecting the selection result relating to the applicable patterns in a pre-prepared construction procedure template and operating procedure template, respectively.

* * * * *